July 17, 1962    J. W. BAREFOOT    3,044,670
METHOD AND APPARATUS FOR MAKING ORNAMENTAL OBJECTS
Filed March 27, 1961    6 Sheets-Sheet 1

INVENTOR:
JOE W. BAREFOOT

BY Eaton, Bell, Hunt & Seltzer

ATTORNEYS

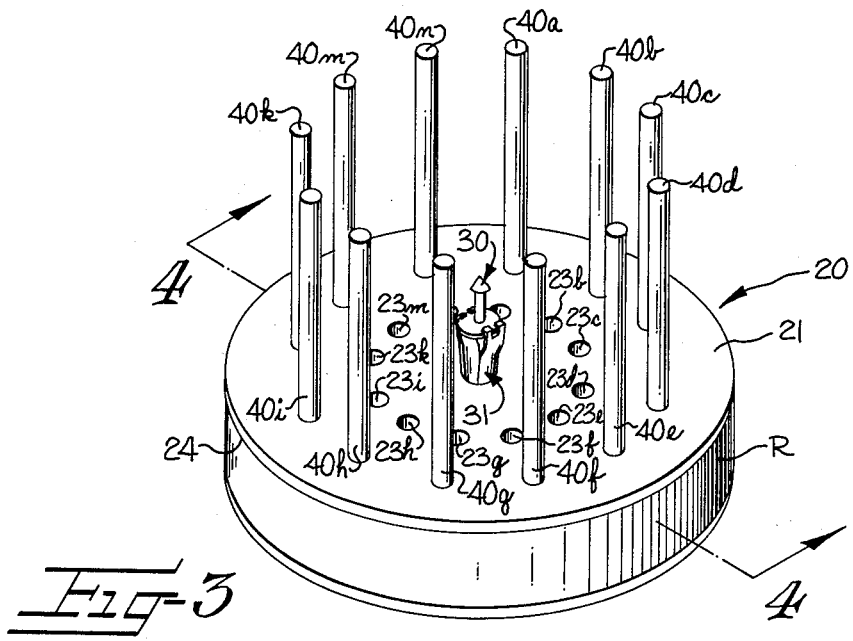
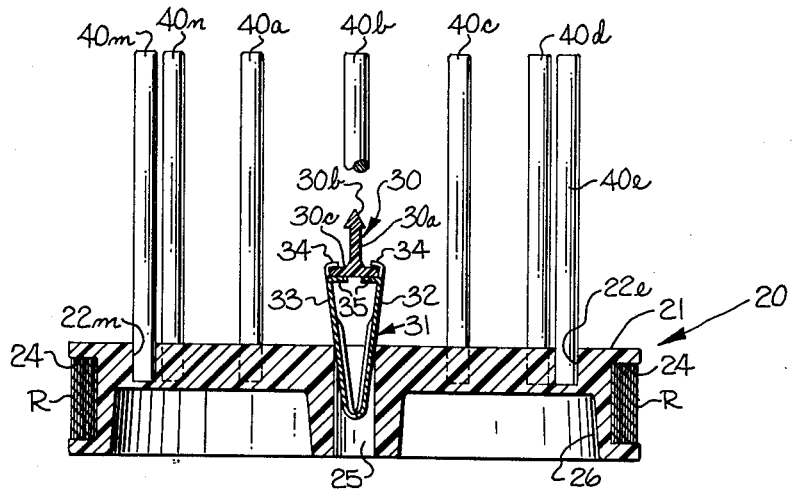

July 17, 1962  J. W. BAREFOOT  3,044,670
METHOD AND APPARATUS FOR MAKING ORNAMENTAL OBJECTS
Filed March 27, 1961  6 Sheets-Sheet 3
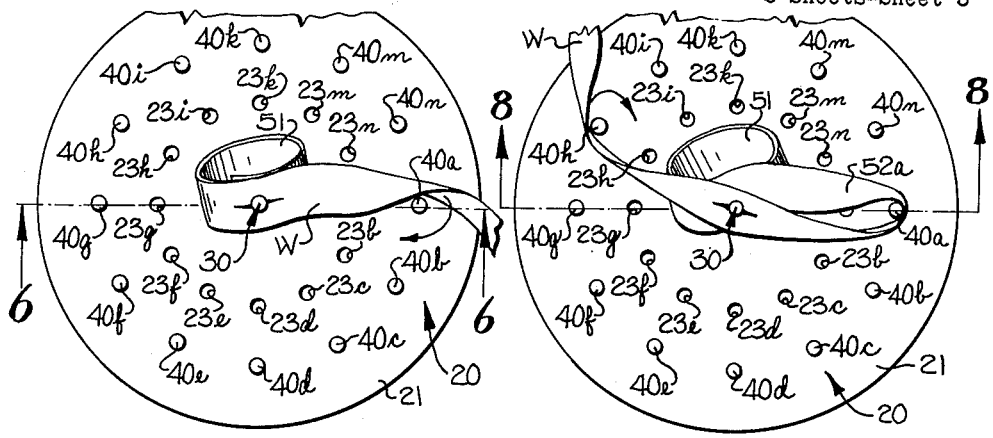
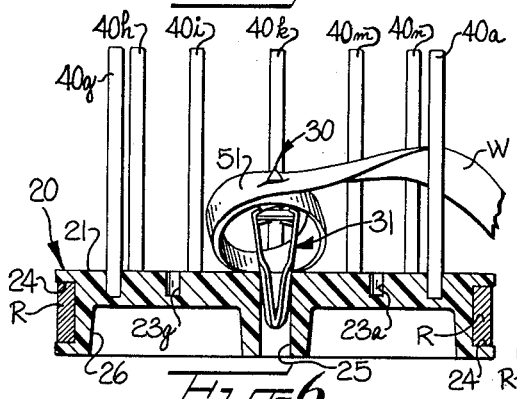
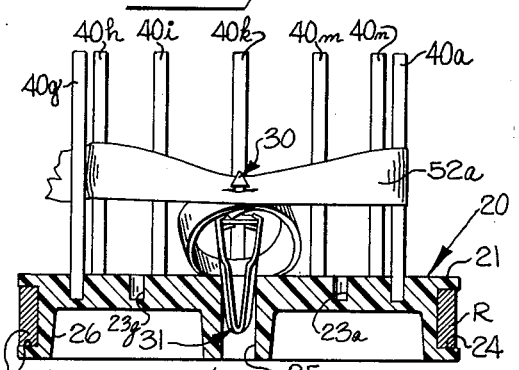
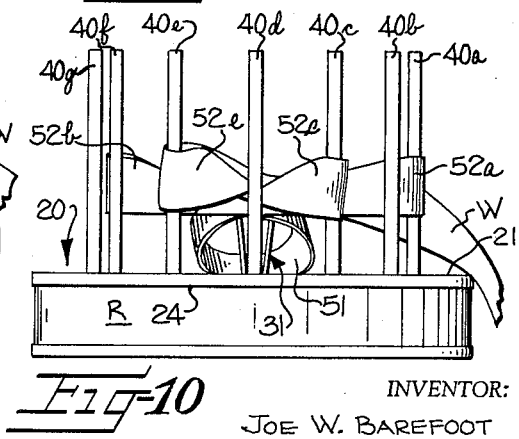
INVENTOR:
JOE W. BAREFOOT
BY Eaton, Bell, Hunt & Seltzer
ATTORNEYS

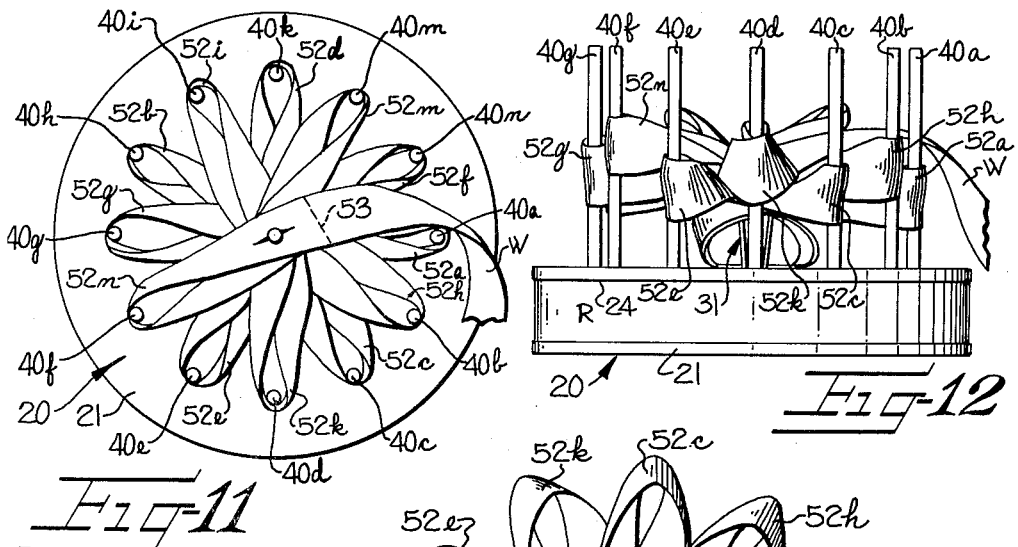

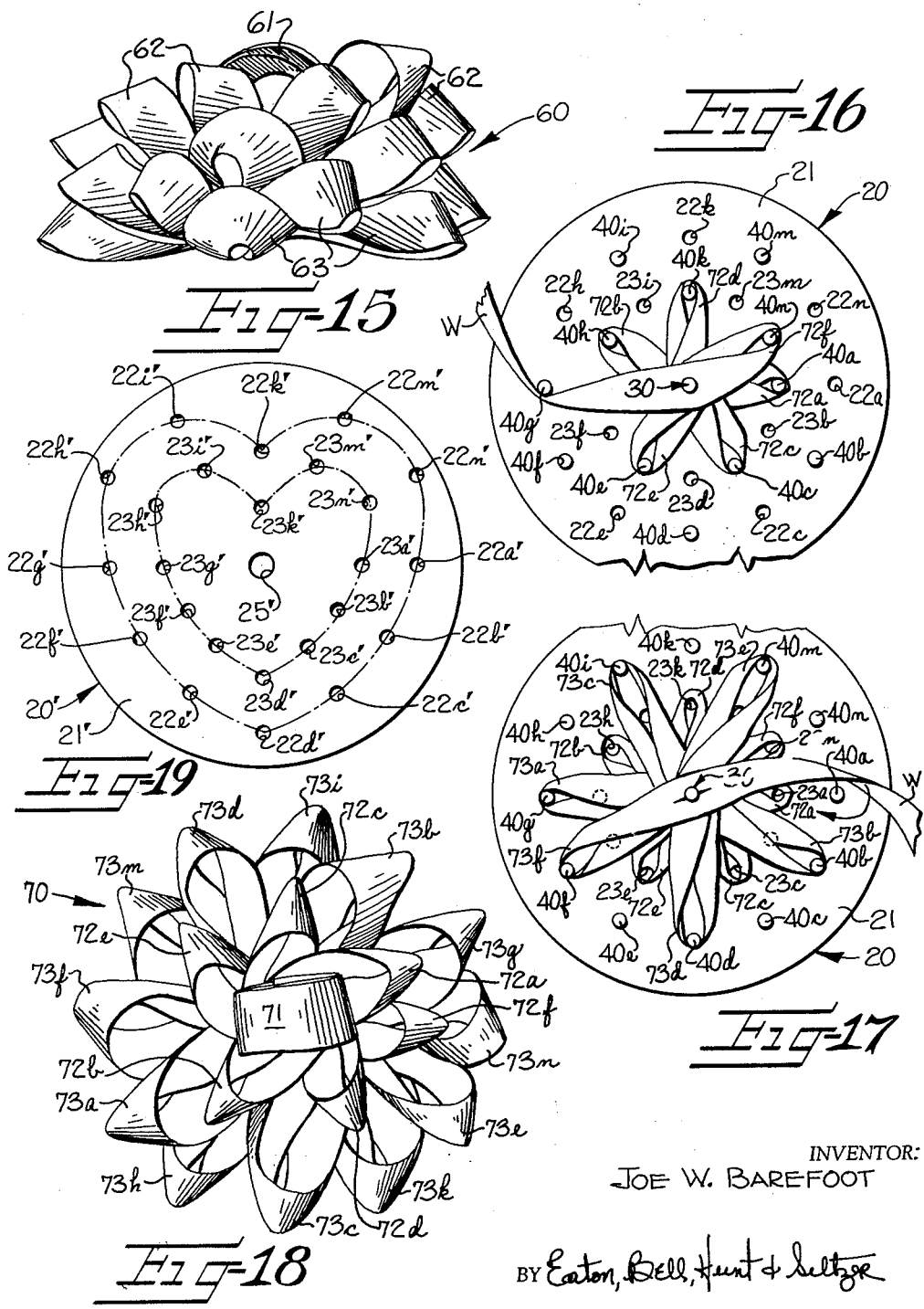

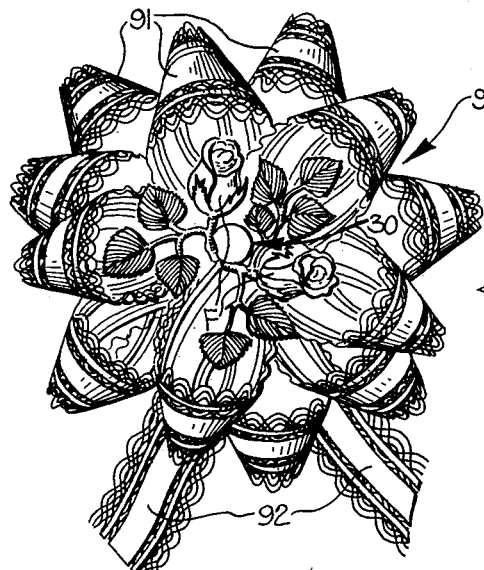
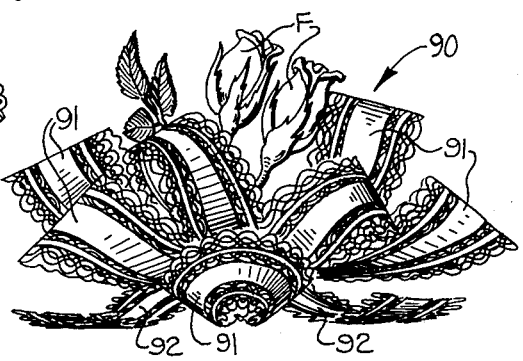
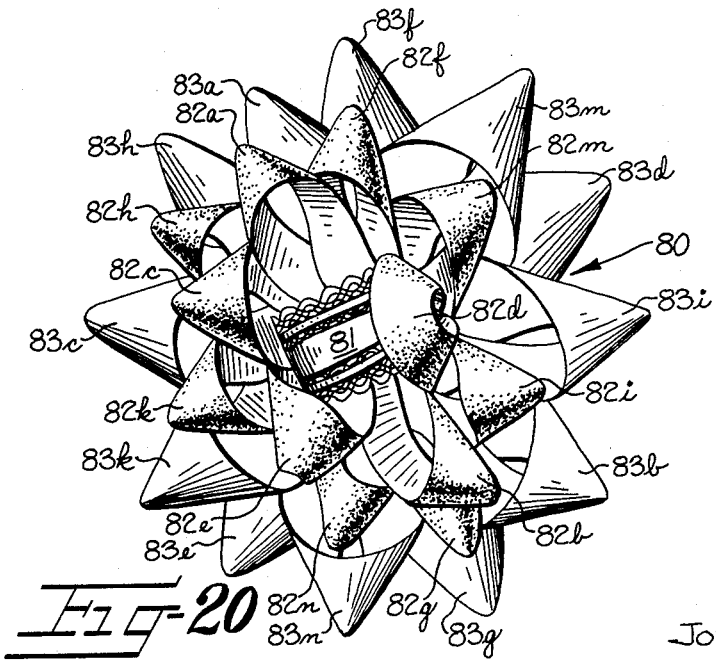

United States Patent Office 3,044,670
Patented July 17, 1962

3,044,670
METHOD AND APPARATUS FOR MAKING ORNAMENTAL OBJECTS
Joe W. Barefoot, Charlotte, N.C., assignor to Volume Builders Corp., Charlotte, N.C.
Filed Mar. 27, 1961, Ser. No. 98,487
10 Claims. (Cl. 223—46)

The present invention relates to a novel method and apparatus for making ornamental objects from a web of ribbon-like material.

It is an object of the present invention to provide a novel, simplified apparatus for making ornamental objects such as decorative bows for gift wrapping, corsages and the like of a plurality of different sizes, shapes and designs not heretofore possible.

A more specific object of the present invention is to provide a novel apparatus of the character last described comprising a plurality of upstanding pegs arranged in a predetermined pattern and adapted to have loops of a web of ribbon-like material formed thereabout with the running lengths thereof converging toward the central portion of said pattern, and a fastening element centrally disposed in said pattern for securing the running lengths of said loops together to form the ornamental object.

Another object of the present invention is to provide a novel apparatus of the character described having a plurality of upstanding pegs which may be arranged in a predetermined pattern to form loops of different lengths and number so that ornamental objects of a variety of shapes and designs may be formed thereby.

A still further object of the present invention is to provide a novel apparatus of the character described having a plurality of upstanding pegs arranged in a predetermined pattern around which loops of a web of ribbon-like material may be formed and a fastening element disposed centrally of said pattern for securing the running lengths of said loops together to form the ornamental object, the arrangement of parts permitting the loops to be formed of different ribbon-like material having different characteristics thereby making ornamental objects of a variety of designs.

A still further object of the present invention is to provide a novel method of making ornamental objects of a variety of sizes, shapes and designs comprising the steps of arranging a plurality of upstanding pegs in a predetermined pattern around a fastening element, succcessively forming an independent loop around at least one of said pegs with the running lengths thereof converging toward said fastening element, and securing said running lengths to said fastening element to form the ornamental object.

Some of the objects of the invention having been stated, other objects will appear as the description proceeds, when taken in connection with the acccompanying drawings, in which—

FIGURE 3 is an isometric view of the apparatus shown in FIGURE 2 with the upstanding pegs and fastening element mounted thereon;

FIGURE 4 is a vertical section taken substantially along line 4—4 of FIGURE 3;

FIGURE 5 is a plan view of the apparatus shown in FIGURE 4 illustrating the initial step of the novel method of the present invention;

FIGURE 6 is a vertical section taken substantially along line 6—6 of FIGURE 5;

FIGURE 7 is a plan view similar to FIGURE 5 illustrating another step of the method of the present invention and showing the first loop of an ornamental object;

FIGURE 8 is a vertical section taken substantially along line 8—8 of FIGURE 7;

FIGURE 9 is a plan view similar to FIGURES 5 and 7 illustrating still another step in the novel method of the present invention and showing five loops of an ornamental object already formed;

FIGURE 10 is a side elevation of the structure shown in FIGURE 9;

FIGURE 11 is a plan view similar to FIGURE 9 showing loops formed around each of the upstanding pegs and illustrating the first step in the formation of a second set of loops according to the method of the present invention;

FIGURE 12 is a side elevational view of the structure shown in FIGURE 11;

FIGURE 13 is a top plan view of the ornamental object shown in FIGURE 11 in inverted position;

FIGURE 14 is a top plan of another ornamental object which may be formed utilizing the method of the present invention;

FIGURE 15 is a side elevational view of the ornamental object shown in FIGURE 14 looking in the direction of arrow 15;

FIGURE 16 is a top plan of the apparatus of the present invention illustrating another embodiment of the method of the present invention;

FIGURE 17 is a plan view similar to FIGURE 16 illustrating further steps in the second embodiment of the method of the present invention;

FIGURE 18 is a top plan view of an ornamental object formed from the method illustrated in FIGURES 16 and 17;

FIGURE 19 is a top plan view of another embodiment of the apparatus of the present invention showing the recesses formed in different pattern;

FIGURE 20 is a top plan view of still another ornamental object which may be formed utilizing the apparatus and method of the present invention;

FIGURE 21 is a top plan view of still another type of ornamental object which may be formed utilizing the method and apparatus of the present invention; and FIGURE 22 is a side elevational view of the ornamental object shown in FIGURE 21.

Figure 1:
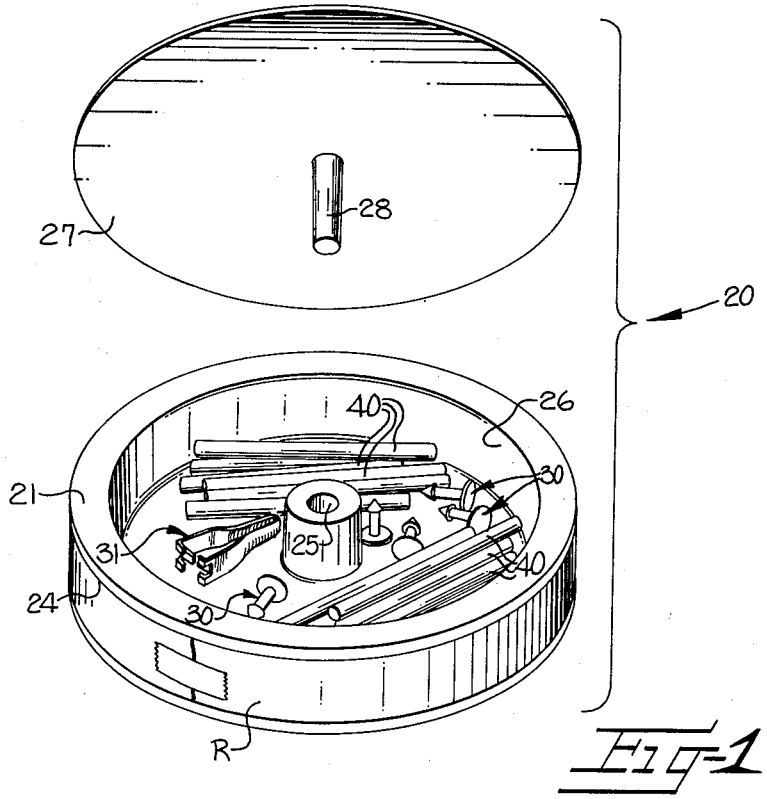
FIGURE 1 is an exploded isometric view of a kit embodying the novel apparatus of the present invention.
Figure 2:
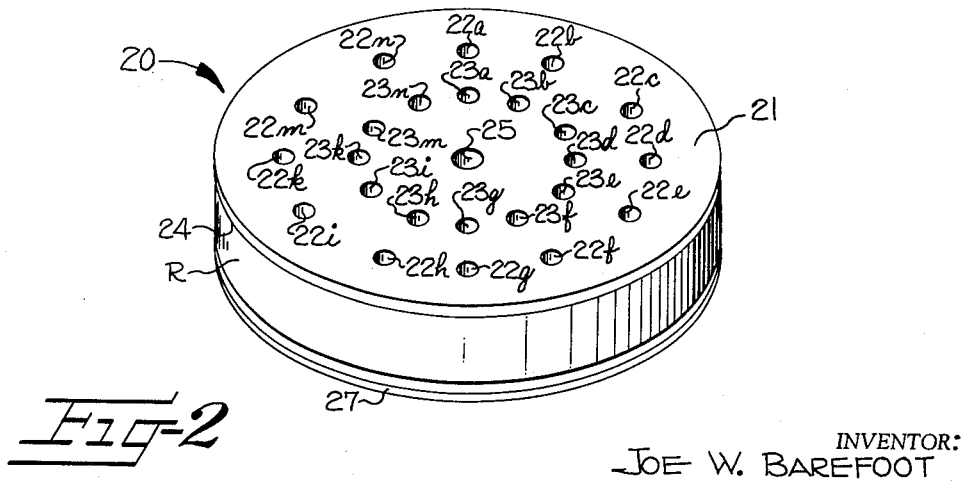
FIGURE 2 is an isometric view looking at the opposite side of the kit shown in FIGURE 1.

Referring now to the drawings and particularly to FIGURES 1 through 4, the novel apparatus of the present invention is generally indicated at 20 and comprises a base 21 having an outer ring of recesses 22a, 22b, 22c, 22d, 22e, 22f, 22g, 22h, 22i, 22k, 22m and 22n and an inner ring 23a, 23b, 23c, 23d, 23e, 23f, 23g, 23h, 23i, 23k, 23m and 23n therein. Base 21 may be constructed in any geometric shape and recesses 22 and 23 may be formed therein in any predetermined pattern or patterns. Also, although twelve recesses are shown in each ring of recesses, it is to be understood that any desired number of recesses may be provided, arranged in any desired pattern or patterns.

Base 21 is shown herein as being constructed in the form of a spool-like object which is adapted to receive ribbon-like material R in a groove 24 formed in the outer periphery thereof. Base 21 has an opening 25 formed in the center thereof to serve as an axis for rotation of base 21 as the ribbon-like material R is wound thereon and for other reasons to be presently described. Base 21 also has an annular recess 26 formed therein for reasons which will also be presently described. Recess 26 is adapted to be closed by cover member 27 having a wedge portion 28 which is insertable into the opening 25 in the base portion to releasably hold the cover 27 in position to close recess 26.

A fastening element 30 is mounted generally in the center of the pattern of recesses 22 and 23 on the base 21 by a clip member 31 which is inserted in hole 25 formed in base portion 21. Fastening element 30 comprises a body portion 30a with a pointed or barbed end portion 30b formed at one end and a flange portion 30c at the other end which therefore define opposing means for retaining the web on body portion 30a. Clip 31 comprises a generally U-shaped member having a pair of legs 32 and 33. Legs 32 and 33 have a pair of inturned flanges 34, 35 formed on the upper end thereof which are spaced apart a distance at least equal to the thickness of flange 30c and are adapted to receive the same therebetween, preferably with a tight fit so that fastening element 30 is securely held in upright position. The lower portion of said legs are suitably curved for conformity with opening 25 into which it is inserted. It is noted that when the lower portion of clip 31 is inserted into opening 25, legs 32, 33 are forced toward each other thereby securely gripping flange 30c of fastening element 30 therebetween.

A plurality of members or pegs 40a, 40b, 40c, 40d, 40e, 40f, 40g, 40h, 40i, 40k, 40m and 40n are provided and are positioned in the recesses 22 or 23 to mount the same on base 21 in upstanding relationship around the fastening element 30 in any predetermined pattern or patterns. While recesses 22 and 23 are shown as one form of means for mounting the upstanding pegs 40 on base 21, any suitable means may be employed including, for example, short upstanding studs extending from base 21 and mating in tubular pegs 40 or suitable recesses or holes provided in the lower ends of pegs 40.

When not in use, clip 31 and pegs 40 may be removed from opening 25 and recesses 22 or 23 and placed in the annular recess 26 along with a supply of fastening elements 30 (FIGURE 1). With the fastening elements 30, clip 31 and pegs 40 disposed in the recess 26, cover member 27 may be placed in position with wedge 28 inserted into opening 25 to close the recess 26 and securely store the fastening elements, clip and pegs within base 21. It is noted that the apparatus 20 of the present invention may be packaged in this manner for sale to prospective customers. While the above described construction is preferred, it is contemplated that base 21 may be formed in any configuration such as a flat plate of any geometric shape.

While the recesses 22 and 23 are preferably arranged in a circular pattern around opening 25, it is contemplated as aforementioned, that the same could be arranged in any desired pattern. For example, the embodiment of the apparatus of the present invention shown in FIGURE 19, wherein like reference characters are used to indicate like parts with the prime notation added, has recesses 22' and 23' arranged in a heart-shaped pattern around opening 25'.

Referring now to FIGURES 5 through 12 wherein one embodiment of the method of the present invention is illustrated, the lower end portion of pegs 40a, 40b, 40c, 40d, 40e, 40f, 40g, 40h, 40i, 40k, 40m and 40n are inserted in the corresponding recesses 22 in any desired pattern. Flange 30c of fastening element 30 is inserted between flanges 34, 35 of clip 31 and the lower portion of clip 31 is then inserted in opening 25 such that fastening element 30 is positioned substantially centrally of the peg pattern. To form an ornamental object such as bow 50 shown in FIGURE 13, a circular loop 51 is formed in one end of the web W of ribbon-like material R with one side of the loop being placed on the body portion 30a of fastening element 30 by piercing the web W by point 30b. It will therefore be apparent that the end portion of web W will be anchored adjacent the central portion of the pattern of pegs with the closed circular loop 51 depending from the fastening element 30. The web W is then passed around peg 40a and returned to fastening element 30. When returned, web W is again pierced by point 30b to form a loop 52a having a bight portion formed around peg 40a with running lengths thereof converging toward fastener element 30. A second loop 52b is formed in the same manner as loop 52a by passing the web W around peg 40h which is disposed generally on the opposite side of fastening element 30 from peg 40a and securing the running length to fastening element 30. A third loop 52c is formed in the same manner as loops 52a, 52b by passing the web W around peg 40c and securing the running length to fastening element 30 and a fourth loop 52d is formed in like manner around peg 40k. Independent loops 52e, 52f, 52g, 52h, 52i, 52k, 52m and 52n are formed around the remaining pegs 40e, 40n, 40g, 40b, 40i, 40d, 40m and 40f, respectively, in like manner to those previously described. After the formation of loop 52n, web W may be severed adjacent fastening element 30 as indicated by the dotted line 53 in FIGURE 11. Whereas each of the loops are shown and described as being formed around only one of the pegs 40, it is contemplated that the same could be formed around more than one if desired. Also, the order in which the loops are formed may be varied by using any one of the pegs 40 as a starting point.

Bow 50 is then completed and is removed from apparatus 25 by removal of loops 52 from pegs 40 and fastening element 30 from clip 31. Once removed from apparatus 20, bow 50 is inverted and is then ready for use as an ornament for gifts or the like. It is noted that bow 50 may be attached to a gift or the like by insertion of point 30b of fastening element 30 through the material in which the gift is wrapped or by any other suitable means.

If desired, the web W may be used to form a different ornamental object such as bow 60 (FIGURES 14 and 15). In the formation of bow 60, a central loop 61 is formed in the same manner as loop 51. Then independent loops 62a, 62b, 62c, 62d, 62e, 62f, 62g, 62h, 62i, 62k, 62m and 62n are formed around pegs 40 in the same manner and in the same order as loops 52 described above. However, web W is not severed adjacent fastening element 30 as at 53, but is used to form a second set of independent loops 63a, 63b, 63c, 63d, 63e, 63f, 63g, 63h, 63i, 63k, 63m and 63n around the pegs 40 in the same manner and order as loops 62. After the formation of loops 63, web W is then severed along a line similar to the dotted line 53 shown in FIGURE 11. Bow 60 is then completed and is removed from apparatus 20 in the same manner as ornamental object 50. When inverted, bow 60 is ready to be used for any desired decorative purpose.

It is noted that a smaller ornamental object similar to bows 50 and 60 may be formed by placing all of the pegs 40 in recesses 23 and then forming independent loops thereabout in the same manner and order as in the formation of bows 50 and 60.

It is to be understood that the number of loops formed on the pegs 40 may be varied as desired to form ornamental objects having varying numbers of loops or objects of different designs. It is noted that it is not necessary in the formation of ornamental objects similar to that shown in FIGURES 13 and 14 to form loops around all of the pegs 40. It is contemplated within the scope of the present invention that any desired number of pegs may be used depending upon the number of loops which is desired to be formed in the finished ornamental object. Also, the distance the pegs are positioned from the fastening element 30 may be varied as desired without departing from the spirit of the present invention.

Referring now to FIGURES 16 through 18 wherein another embodiment of the method of the present invention is illustrated, pegs 40a, 40c, 40e, 40h, 40k and 40n are removed from their corresponding recesses 22a, 22c, 22e, 22h, 22k and 22n and placed in the recesses 23a, 23c, 23e, 23h, 23k and 23n while the remaining pegs 40b, 40d, 40f, 40g, 40i and 40m remain in their corresponding recesses 22b, 22d, 22f, 22g, 22i and 22m. A generally circular central loop 71 is formed in like manner as loops 51 and 61 on fastening element 30. Independent loops 72a, 72b, 72c, 72d, 72e and 72f are formed in the same manner as previously described around pegs 40a, 40h, 40c, 40k, 40e and 40n, respectively, mounted in the corresponding recesses 23a, 23h, 23c, 23k, 23e and 23n. Independent loops 73a, 73b, 73c, 73d, 73e and 73f are formed around pegs 40g, 40b, 40i, 40d, 40m and 40f, respectively, which are mounted in the corresponding recesses 22g, 22b, 22i, 22d, 22m and 22f. After the formation of loop 73f, pegs 40a, 40c, 40e, 40h, 40k and 40n are removed from the recesses 23a, 23c, 23e, 23h, 23k and 23n and placed in the recesses 22a, 22c, 22e, 22h, 22k and 22n. Independent loops 73g, 73h, 73i, 73k, 73m and 73n are then formed around pegs 40a, 40h, 40c, 40k, 40e and 40n. Web W is severed adjacent fastening element 30 in the manner illustrated by dotted line 53 (FIGURE 11) and the completed bow 70 (FIGURE 18) is removed from apparatus 20 and inverted.

It should be noted that all of the bows heretofore described and methods of making bows result in the formation of a bow wherein the bights of the loops of the finished bow when viewed in plan present downwardly tapering outer surface portions simulating points of a star for example. It should further be noted that the loops of ribbon-like material forming the bights are not canted or inclined relative to each other, but assume a uniform stabilized position presenting substantially uniform tapered upper surface portions. These general features of the bows formed according to this invention are very desirable features for presenting a pleasing and attractive bow.

It should further be noted that the disclosed methods for forming these loops of bows involve looping the ribbon-like material around the respective pegs in the same direction, i.e., shown as being clockwise in the drawings. However, it has been determined that the desired type of bows may readily be formed by directing all of the loops around the respective pegs in a counter clockwise direction necessitating, however, a different sequence of pegs being looped. For example, the formation of a bow such as shown in FIGURES 13 and 14 would involve counter clockwise looping of the material around the pegs in the following order: 40a, 40f, 40m, 40d, 40i, 40b, 40g, 40n, 40e, 40k, 40c and 40h. Of course, this order could readily be varied by selecting any of the pegs as a starting point.

It has also been determined that bows having the aforementioned desirable features can be made by forming alternate loops by passing the web around their respective pegs in one direction, i.e., clockwise, and by forming intervening loops by passing the web around their respective pegs in an opposite direction, i.e., counter clockwise, to the alternate loop formation or vice versa. In this type of method, it has been determined that the best results are obtainable wherein successive pairs of looped pegs are diametrically opposed.

It thus should be apparent that for forming bows of the desired type illustrated in the drawings, consideration must be given to the direction in which the respective loops are formed and the sequence of pegs to be looped. While it is to be distinctly understood that bows of the type illustrated and herein described are preferred, this invention may be practiced for making other types of bows even though it is felt that other types would not have the pleasing appearance and attractiveness of the bows herein illustrated. It therefore follows that although the various methods herein disclosed are preferred, the invention is not restricted thereto.

While the ornamental objects 50, 60 and 70 are shown and described as being formed from a continuous web W, it is contemplated that the same could be formed from discontinuous lengths of the same or different materials. Actually, each of the independent loops could be formed of a separate length of the same or different material, it only being necessary that such lengths be of sufficient longitudinal dimension to form at least one loop. For example, an ornamental object 80 (FIGURE 20) is constructed of three different materials. A central loop 81 is formed from a length of lace-like material. Independent loops 82a, 82b, 82c, 82d, 82e, 82f, 82g, 82h, 82i, 82k, 82m and 82n are formed of a web of a different material of a predetermined width and color, whereas independent loops 83a, 83b, 83c, 83d, 83e, 83f, 83g, 83h, 83i, 83k, 83m and 83n are formed of a web of a different width and color of the same or a different material. It is to be noted that the combination of different materials, widths, colors, etc. may be varied as desired without departing from the spirit of the instant invention.

Ornamental objects 50, 60, 70 and 80 are shown in the form of decorative bows for use in gift wrapping and other types of decorations in which bows are used. However, it is contemplated that other types of ornamental objects may be formed utilizing the novel method and apparatus of the present invention. For example, a corsage 90 (FIGURES 21 and 22) could be made by forming a plurality of loops 91 with a pair of streamers 92 extending outwardly therefrom which would serve as a backing frame and support for suitable flowers F which could be attached to fastening element 30 in any conventional manner.

It will therefore be apparent that a novel apparatus and method for making ornamental objects such as decorative bows, corsages and the like is provided which is capable of making said ornamental objects in a plurality of different sizes, shapes and designs, said apparatus being of extremely simplified compact construction.

In the drawings and specification there have been set forth preferred embodiments of the invention and, although specific terms are employed, they are used in a generic and descriptive sense only and not for purposes of limitation, the scope of the invention being defined in the claims.

I claim:

1. Apparatus for making ornamental objects from a web of ribbon-like material comprising a circular base adapted to receive the web around the periphery thereof having a plurality of openings in one side thereof, a groove formed in the outer periphery thereof and adapted to receive the web therein when the same is wound around the periphery of said base, and a recess formed in the side opposite from said openings, a plurality of spaced apart upstanding pegs positioned in a predetermined number of said openings and in a predetermined pattern when in use, said pegs being adapted to receive thereabout loops of the ribbon-like material having a bight portion and running length portions, a fastening element comprising an elongate body portion, an annular flange integral with said body portion and disposed at one end thereof, and a barbed end portion integral with said body portion and disposed at the other end thereof, said fastening element being adapted to be disposed on said base in upstanding relation with the barbed end portion uppermost substantially centrally of said peg pattern for receipt of the running lengths of the loops by insertion of the barbed end portion therethrough to secure the loops together into the finished ornamental object, said recess being adapted to receive said pegs and fastening element for storage when not in use, and a cover member adapted to be mounted on said base over said recess to close the same and hold said pegs and fastening element therein.

2. A method of making ornamental objects from a web of ribbon-like material comprising the steps of arranging a plurality of spaced apart upstanding pegs in a predetermined pattern, forming a generally circular loop in an end portion of the web, impaling one side of the circular loop on a fastening element, positioning the circular loop and fastening element substantially centrally of the peg pattern, forming a loop in the web by passing the same around at least one of the pegs, returning the web to the fastening element and impaling the same thereon, forming another loop in the web by passing the same around at least one other peg disposed generally on the opposite side of said fastening element from the first looped peg, returning the web to the fastening element and impaling the same thereon, and continuing in like manner the formation of loops around the remaining pegs in the pattern until the desired number of loops is formed, and removing the thusly formed loops and the fastening element interconnecting the same from association with the upstanding pegs to thus present the finished ornamental object.

3. A method of utilizing a plurality of pegs for making ornamental objects such as bows from a web of ribbon-like material comprising the steps of arranging a predetermined number of the plurality of pegs in spaced apart upstanding relation and in a predetermined pattern, anchoring the web in the central portion of the pattern, directing the web from the central portion around at least one of the pegs to form a loop therein, returning the web to the central portion of the pattern, again anchoring the web in the central portion in overlying relation to the previously anchored web portion, directing the web from the central portion around at least one other peg disposed generally on the opposite side of the pattern from the first looped peg to form another loop in the web, again returning the web to the central portion of the pattern and anchoring the same in overlying relation to the previously anchored web portions, continuing in like manner the formation of loops around the remaining pegs of the predetermined number of pegs, rearranging the plurality of pegs in a different pattern and then forming loops in the web around the plurality of pegs in like manner to the previously formed loops until the desired number of loops is formed.

4. A method of utilizing a plurality of spaced apart upstanding pegs arranged in a predetermined pattern for making ornamental objects such as bows from webs of ribbon-like materials having different characteristics comprising the steps of selecting one of the webs, anchoring the selected web in the central portion of the pattern, directing the web from the central portion around at least one of the pegs to form a loop therein, returning the web to the central portion of the pattern, again anchoring the web in the central portion in overlying relation to the previously anchored web portion, directing the web from the central portion of the pattern around at least one other peg disposed generally on the opposite side of the pattern from the first looped peg to form another loop in the web, again returning the web to the central portion of the pattern, again anchoring the web in the central portion in overlying relation to the previously anchored web portions, continuing in like manner the formation of loops in the web around a predetermined number of the plurality of pegs, severing the selected web, selecting another web and anchoring the same in the central portion of the pattern in overlying relation to the anchored web portions of the previous web, and then forming loops in the web in like manner to the loops formed in the previous web around a predetermined number of the plurality of pegs until the desired number of loops is formed.

5. A method of utilizing a plurality of spaced apart upstanding pegs arranged in a predetermined pattern for making ornamental objects such as bows from a web of ribbon-like material comprising the steps of anchoring the web on a fastening element removably disposed in the central portion of the pattern, directing the web from the central portion around at least one of the pegs in a given direction to form a loop therein, returning the web to the central portion of the pattern and anchoring the same in overlying relation to the previously anchored web portion, directing the web from the central portion around at least one other peg disposed diametrically opposite the first looped peg in an opposite direction to the given direction to form another loop in the web, again returning the web to the central portion and anchoring the same in overlying relation to the previously anchored web portions, continuing in like manner with the remaining pegs in the pattern until the desired number of loops is formed with alternate loops formed in one direction and intervening loops formed in the opposite direction and with successive pairs of loops diametrically opposed, and removing the thusly formed loops and the fastening element from association with the upstanding pegs to thus present the finished ornamental object.

6. Apparatus for making ornamental objects from a web of ribbon-like material comprising a base, a plurality of upstanding spaced apart members mounted on said base in a predetermined pattern and adapted to receive thereabout loops of the ribbon-like material having a bight portion and running length portions, and upright fastening means removably disposed on said base substantially centrally of said pattern with the upper end thereof disposed at a lower elevation than the upper ends of said members for impalingly receiving the running length portions thereon and for securing the same into the finished ornamental object.

7. Apparatus for making ornamental objects from a web of ribbon-like material comprising a base, a plurality of upstanding spaced apart members mounted on said base in a predetermined pattern and adapted to receive thereabout loops of the ribbon-like material having a bight portion and running length portions, and an upright fastening element removably disposed on said base substantially centrally of said pattern and having a pointed upper end and spaced apart ribbon retaining means therebelow, said pointed upper end being adapted to impalingly receive the running length portions thereon and said retaining means defining an area therebetween for receipt of the running length portions of said loops to secure the same into the finished ornamental object.

8. Apparatus for making ornamental objects from a web of ribbon-like material comprising a base, a plurality of upstanding spaced apart members mounted on said base in a predetermined pattern and adapted to receive thereabout loops of the ribbon-like material having a bight portion and running length portions, and an upright fastening element removably disposed on said base substantially centrally of said pattern and having a pointed, barbed upper end and a flange portion therebelow, said upper end being adapted to impalingly receive the running length portions thereon and said barbed upper end and said flange portion defining an area therebetween for receipt of the running length portions of said loops to secure the same into the finished ornamental object.

9. Apparatus for making ornamental objects from a web of ribbon-like material comprising a base, a plurality of upstanding spaced apart pegs mounted on said base in a predetermined pattern and adapted to receive thereabout loops of the ribbon-like material having a bight portion and running length portions, an upright fastening element having a pointed, barbed upper end and a flange portion therebelow, said pointed upper end being adapted to impalingly receive the running length portions thereon and said barbed upper end and said flange portion defining an area therebetween for receipt of the running length portions of said loops to secure the same into the finished ornamental object, and means removably mounting said fastening element on said base substantially centrally of said peg pattern.

10. A method of forming an ornamental object while utilizing a plurality of spaced upstanding pegs arranged in a predetermined pattern and wherein a fastening element is removably positioned substantially centrally of the peg pattern and which fastening element becomes an integral part of the finished ornamental object, said method comprising the steps of impaling the web on the fastening element, directing the web from the fastening element around at least one of the pegs to form a loop thereon, returning the web to the fastening element, again impaling the web on the fastening element in overlying relation to the previously impaled web portion, directing the web from the fastening element around at least one other peg disposed generally on the opposite side of the fastening element from the first looped peg to form another loop in the web, again returning the web to the fastening element and impaling the same thereon, continuing in like manner with the remaining pegs in the pattern until the desired number of loops has been formed, and removing the thusly formed loops and the fastening element interconnecting the same from association with the upstanding pegs to thus present the finished ornamental object.

References Cited in the file of this patent
UNITED STATES PATENTS

| | | |
|---|---|---|
| 1,537,790 | Alpe | May 12, 1925 |
| 2,528,820 | Cook | Nov. 7, 1950 |
| 2,666,249 | Ruiz et al. | Jan. 19, 1954 |
| 2,750,651 | Saito | June 19, 1956 |
| 2,763,080 | Welch | Sept. 18, 1956 |
| 2,775,377 | Cook | Dec. 25, 1956 |
| 2,905,368 | Runyan | Sept. 22, 1959 |